US010011894B2

(12) United States Patent
Ikeda et al.

(10) Patent No.: US 10,011,894 B2
(45) Date of Patent: Jul. 3, 2018

(54) PRECIPITATION-HARDENING STAINLESS STEEL POWDER AND SINTERED COMPACT THEREOF

(71) Applicant: Sanyo Special Steel Co., Ltd., Himeji-shi (JP)

(72) Inventors: Hiroki Ikeda, Himeji (JP); Yuichi Nagatomi, Himeji (JP)

(73) Assignee: Sanyo Special Steel Co., Ltd., Himeji-shi (JP)

( * ) Notice: Subject to any disclaimer, the term of this patent is extended or adjusted under 35 U.S.C. 154(b) by 174 days.

(21) Appl. No.: 15/112,569

(22) PCT Filed: Mar. 13, 2015

(86) PCT No.: PCT/JP2015/057575
§ 371 (c)(1),
(2) Date: Jul. 19, 2016

(87) PCT Pub. No.: WO2015/137507
PCT Pub. Date: Sep. 17, 2015

(65) Prior Publication Data
US 2016/0333450 A1 Nov. 17, 2016

(30) Foreign Application Priority Data

Mar. 14, 2014 (JP) ................................. 2014-052499
Mar. 18, 2014 (JP) ................................. 2014-054329

(51) Int. Cl.
| | | |
|---|---|---|
| B22F 1/00 | (2006.01) |
| B22F 3/105 | (2006.01) |
| B22F 3/16 | (2006.01) |
| B29C 67/00 | (2017.01) |
| B33Y 70/00 | (2015.01) |
| C22C 38/00 | (2006.01) |
| C22C 38/04 | (2006.01) |
| C22C 38/50 | (2006.01) |
| C22C 33/02 | (2006.01) |
| C22C 38/58 | (2006.01) |
| C22C 38/48 | (2006.01) |
| C22C 38/42 | (2006.01) |
| C22C 38/44 | (2006.01) |
| C22C 38/02 | (2006.01) |
| C22C 38/06 | (2006.01) |
| B22F 3/24 | (2006.01) |

(52) U.S. Cl.
CPC ............ *C22C 38/58* (2013.01); *B22F 1/0003* (2013.01); *B29C 67/00* (2013.01); *B33Y 70/00* (2014.12); *C22C 33/0285* (2013.01); *C22C 38/001* (2013.01); *C22C 38/02* (2013.01); *C22C 38/04* (2013.01); *C22C 38/06* (2013.01); *C22C 38/42* (2013.01); *C22C 38/44* (2013.01); *C22C 38/48* (2013.01); *C22C 38/50* (2013.01); *B22F 3/16* (2013.01); *B22F 2003/248* (2013.01); *B22F 2301/35* (2013.01); *B22F 2998/00* (2013.01); *C21D 2211/008* (2013.01); *C22C 33/02* (2013.01); *Y02P 10/295* (2015.11)

(58) Field of Classification Search
CPC ............... C21D 211/008; B22F 1/0003; B22F 2301/35; C22C 33/02; C22C 33/0285; C22B 38/58; C22B 38/44; C22B 38/42; C22B 38/48; C22B 38/50; C22B 38/02; C22B 38/001
See application file for complete search history.

(56) References Cited

U.S. PATENT DOCUMENTS

| | | | |
|---|---|---|---|
| 4,378,246 A | 3/1983 | Hoshino et al. | |
| 5,035,855 A | 7/1991 | Utsunomiya et al. | |
| 5,232,520 A * | 8/1993 | Oka | ........................ C22C 38/46 148/325 |
| 5,630,983 A | 5/1997 | Tateyama et al. | |
| 6,461,452 B1 * | 10/2002 | Kosa | ........................ C22C 38/42 148/325 |
| 2009/0047165 A1 | 2/2009 | Syvanen et al. | |
| 2014/0037489 A1 | 2/2014 | Hwang | |

FOREIGN PATENT DOCUMENTS

| | | |
|---|---|---|
| JP | 7242903 A | 9/1995 |
| JP | 10102105 A | 4/1998 |
| JP | 2002249805 A | 9/2002 |
| JP | 2003166003 A | 6/2003 |
| JP | 2004124201 A | 4/2004 |
| JP | 201121218 A | 2/2011 |
| JP | 201431574 A | 2/2014 |

OTHER PUBLICATIONS

Schade et al, "Precipitation-Hardening PM Stainless Sreels", International Journal of POwder Metallurgy, vol. 43, No. 4, Jul./ Aug. 2007, pp. 51-59.*
Schade et al. "Precipitation-Hardening PM Stainless Steels"; International Journal of Powder Metallurgy; 2007; pp. 51-59; vol. 43:4.

* cited by examiner

*Primary Examiner* — C Melissa Koslow
(74) *Attorney, Agent, or Firm* — The Webb Law Firm

(57) ABSTRACT

There is provided a precipitation hardening stainless steel powder including, in percentage by mass: Si: ≤1.0%; Mn: ≤1.8%; Ni: 3.0 to 8.5%; Cr: 12.0 to 20.0%; Mo: 0.1 to 2.5%; Cu: 1.0 to 5.0% and/or Ti+Al: 1.0 to 5.0%; Nb+Ta≥5C or Nb≥5C; N≤350 ppm; and the balance being Fe and incidental impurities. A sintered compact fabricated from the steel powder has a martensite content of 90% or more. The precipitation hardening stainless steel powder provides a sintered compact that exhibits high strength after aging.

15 Claims, No Drawings

PRECIPITATION-HARDENING STAINLESS STEEL POWDER AND SINTERED COMPACT THEREOF

TECHNICAL FIELD

The present invention relates to precipitation hardening stainless steel powder, which provides a sintered compact that exhibits high strength (or high strength and high toughness) after aging, and a sintered compact prepared from the powder.

BACKGROUND ART

A sintered compact of common precipitation hardening stainless steel powder prepared by sintering/shaping, for example, metal powder injection molding (MIM), powder metallurgy, or sintering/shaping by powder deposition (so-called three-dimensional shaping) cannot achieve enough hardness, for example, a hardness of 40 HRC (or 390 HV) or more in a H900 treatment (480° C., air cooling) on a stainless steel SUS630 in accordance with JIS G 4303 only after direct aging treatment i.e. heat treatment for enhancing age hardening at a low temperature of 400 to 600° C.

Although aging treatment of the sintered compact after solution heat treatment at about 1050° C. described in JIS G 4303 can achieve enough hardness, it also causes new problems such as an increased number of steps, generation of distortion resulting from the solution heat treatment involving heating and quenching, and removal of distortion through re-annealing or shape correction. Thus, this cannot be a practical solution. Accordingly, a practical precipitation hardening stainless steel powder is required which can provide high strength only by sintering and aging treatments, but no powder is found which satisfies such requirements at present.

JP-2011-21218A (PTL 1) discloses a method of preparing practical aluminum prototypes and products by direct sintering or melting-solidifying. JP2002-249805A (PTL 2) also discloses another method of producing a sintered compact in which powder material composed of inorganic or organic matter is irradiated with a laser beam to stack melted layers into a desired three-dimensional shape.

Furthermore, JP2004-124201A (PTL 3) discloses a laser beam lithography with metal powder in which the step of sintering a thin metal powder layer into any form desired by laser beam is repeated to fabricate a laminated three-dimensional shaped object, for example, a metal prototype part or an injection mold. These patent documents, however, are all directed to non-ferrous metal, but not directed to treatment of steel powder, especially high strength stainless steel powder.

CITATION LIST

Patent Documents

PTL 1: JP2011-21218A
PTL 2: JP2002-249805A
PTL 3: JP2004-124201A

SUMMARY OF INVENTION

To solve the problems described above, the present inventors have conducted intensive studies on causes of the lack of the increase in age-hardness after the sintering, and have found the following findings. Typical precipitation hardening stainless steel powder (milled or water-atomized) has a high nitrogen content which is not decreased by reduction treatment for low oxygenation; introduction of additional nitrogen during sintering results in an increase in the retained austenite content after a sintering and quenching process; and a decrease in the low carbon martensitic structure contributing to the age-hardening impairs the age-hardenability.

The present inventors have also found that the precipitation hardening stainless steel powder having a martensite content of 90% or more after sintering can be produced by adjusting the nitrogen level in the precipitation hardening stainless steel powder to 350 ppm or less in the composition.

Accordingly, it is an object of the present invention to provide precipitation hardening stainless steel powder which provides a martensite content of 90% or more after sintering, i.e., to provide precipitation hardening stainless steel powder suitable for production of a high-strength sintered compact having sufficient age-hardenability. It is another object of the present invention to provide a high-strength sintered compact or molded product having such sufficient age-hardenability.

According to an embodiment of the present invention, there is provided a precipitation hardening stainless steel powder comprising, in percentage by mass:
C: ≤0.05%;
Si: ≤1.0%;
Mn: ≤1.8%;
Ni: 3.0 to 8.5%;
Cr: 12.0 to 20.0%;
Mo: 0.1 to 2.5%;
Cu: 1.0 to 5.0% and/or Ti+Al: 1.0 to 5.0%;
Nb+Ta≥5C or Nb≥5C;
N≤350 ppm; and
the balance being Fe and incidental impurities, wherein a sintered compact fabricated from the steel powder has a martensite content of 90% or more. The precipitation hardening stainless steel powder preferably has a Mn content of 1.5% or less. The precipitation hardening stainless steel powder may contain one or two of Ti and Al of 1.0 to 5.0% in a total content together with Cu or without Cu.

According to a first preferred embodiment of the present invention, the precipitation hardening stainless steel powder can have a Ni-bal value of −4 or more, wherein the Ni-bal is calculated by expression (1):

$$\text{Ni-bal} = \text{Ni} + 27\text{C} + 23\text{N} + 0.2\text{Mn} + 0.3\text{Cu} - 1.2(\text{Cr}+\text{Mo}) - 0.5\text{Si} - 0.3\text{Nb} + 10 \quad (1).$$

That is, it has been found that the retained austenite content in the sintered compact produced by sintering, for example, the above-described MIM, powder sintering or fused deposition molding, can be kept to be low by control of the nitrogen content and control of the Ni-bal value with reference to a Schaeffler diagram, and as a result, the content of the low-carbon martensitic structure having high age-hardenability can be desirably controlled to be 90% or more. In particular, it has been found that the powder of this embodiment is optimal for imparting the age-hardenability to the sintered compact because the fused deposition molding repeats melting and rapid solidification of powder in a very small region using a high energy sources, such as electron or laser beams. The first preferred embodiment of the present invention is based on such findings.

According to a second preferred embodiment of the present invention, the sintered compact fabricated from the precipitation hardening stainless steel powder can have a grain size number of 7 or more. That is, in the precipitation hardening stainless steel, the appropriate control of Nb, C and N contents lowers the retained austenite content of the sintered compact produced by sintering such as the above-described MIM, powder sintering and fused deposition molding, forming fine Nb carbonitride to refine a grain size of the sintered compact, resulting in achievement of both high age-hardenability and toughness. In particular, it has been found that the powder of the embodiment is optimal for imparting the high-strength age-hardenability and toughness to the sintered compact because the fused deposition molding repeats melting and rapid solidification of powder in a very small region using high energy sources such as electron beams and laser beams. The second preferred embodiment of the present invention is based on such findings.

According to another embodiment of the present invention, there is provided a sintered compact of precipitation hardening stainless steel fabricated from the powder according to the embodiment described above, having a martensite content of 90% or more and a grain size number of 7 or more.

DESCRIPTION OF EMBODIMENT

The precipitation hardening stainless steel powder and its sintered compact will now be described in detail. The content of each element, which is merely represented by %, refers to mass %, unless otherwise specified. The following description applies to both the first preferred embodiment and the second preferred embodiment of the present invention described above, unless otherwise specified.

The precipitation hardening stainless steel powder of the present invention comprises, in percentage by mass, C: ≤0.05%, Si: ≤1.0%, Mn: ≤1.8%, Ni: 3.0 to 8.5%, Cr: 12.0 to 20.0%, Mo: 0.1 to 2.5%, Cu: 1.0 to 5.0% and/or Ti+Al: 1.0 to 5.0%, Nb+Ta≥5C or Nb≥5C, N≤350 ppm, and the balance being Fe and incidental impurities. Furthermore, the precipitation hardening stainless steel powder forms a sintered compact fabricated that has a martensite content of 90% or more.

C: ≤0.05%

In the precipitation hardening stainless steel, the content of C should be kept low so that the processability in a solid solution state is improved and the retained austenite content in the sintered compact is reduced to form a low-C martensitic structure. A high C content increases the hardness at the solid solution state, resulting in poor processability. In the present invention, at the start of solidification during sintering, the content of δ ferrite phase increases, resulting in an increased propensity for cracking. Furthermore, C has a grain refining effect providing a finely formed Nb carbonitride in relation between the contents of Nb and N, but excess addition of C causes coarsening of Nb carbonitride grains, resulting in a poor grain refining effect. Accordingly, the C content is 0.05% or less, preferably 0.03% or less, more preferably 0.015% or less. The C content has no lower limit, and is typically at least 0.001%.

Si: ≤1.0%

Si is an element which is an effective deoxidizer and a hardness enhancer. Enhanced hardness, however, causes increased propensity for cracking and degradation of pitting corrosion resistance. The Si content is, therefore, 1.0% or less, preferably 0.75% or less, more preferably 0.5% or less. The Si content has no lower limit, and is typically at least 0.01%.

Mn: ≤1.8%

Mn is an element effective for increasing strength and toughness. A sintered compact having a Mn content of more than 1.8% decreases in the martensite content and hence lacks the age-hardening effect. The Mn content is, therefore, 1.8% or less, preferably 1.5% or less, more preferably 1.0% or less. The Mn content has no lower limit, and is typically at least 0.01%.

Ni: 3.0 to 8.5%

Ni is an essential element for precipitation hardening, adjusting the entire structure and suppressing the formation of δ ferrite. Such effects however cannot be achieved if the Ni content is less than 3.0%. The Ni content, therefore, is 3.0% or more, preferably 4.0% or more, more preferably 5.0% or more. An excess Ni content however leads to increased retained austenite, causing insufficient precipitation hardenability of the sintered compact. The Ni content is, therefore, 8.5% or less, preferably 7.5% or less, more preferably 7.0% or less.

Cr: 12.0 to 20.0%

The Cr content should be 12.0% or more, preferably 13.0% or more, more preferably 14.5% or more to allow the stainless steel to have sufficient corrosion resistance. A Cr content exceeding 20.0%, however, leads to an increase in the corrosion resistance, and, at the same time, form a ferrite structure instead of a low carbon martensitic structure or retained austenite structure during sintering, resulting in poor precipitation hardenability and low toughness of the material. The Cr content is, therefore, 20.0% or less, preferably 19.0% or less, more preferably 18.0% or less.

Mo: 0.1 to 2.5%

Mo is an element essential for achieving the sufficient corrosion resistance. Excess addition of Mo shifts the Ni balance towards the negative direction, causing the precipitation hardenability and toughness of the material to decrease because the ferrite structure is formed instead of the low carbon martensitic structure or retained austenite structure during sintering. The Mo content is, therefore, 0.1 to 2.5%, preferably 0.5 to 2.0%, more preferably 1.0 to 2.0%.

Cu: 1.0 to 5.0%

Cu is an optional element added alone or in combination with Ti and Al for achieving sufficient precipitation hardenability. To achieve the desired effect, the Cu content is 1.0% or more, preferably 3.0% or more, more preferably 3.2% or more. A Cu content exceeding 5% leads to low toughness and poor hot workability of the sintered compact although the hot workability does not matter too much in the usage of present invention. The Cu content is, therefore, 5.0% or less, preferably 4.8% or less, more preferably 4.5% or less.

Ti+Al: 1.0 to 5.0%

One or two of Ti and Al, which are optional elements, are added alone or in combination with Cu for achieving the sufficient precipitation hardenability. To achieve the desired effect, the total content of Ti+Al is 1.0% or more, preferably 1.2% or more, more preferably 1.5% or more. A total content of Ti+Al of more than 5% however leads to low toughness and the predominant formation of δ ferrite so that the carbon martensitic structure and the retained austenite structure are barely formed during sintering. The total content of Ti+Al, therefore, is 5.0% or less, preferably 4.5% or less, more preferably 4.0% or less. Ti+Al (i.e., one or two of Ti and Al) may be added together with C or without C (i.e., instead of C).

Nb+Ta≥5C or Nb≥5C

Nb+Ta or Nb is an essential element for enhancing the stabilization of C and the degree of the precipitation hardening, the content of which is desirably at least 5C (i.e., 5 times the C content). Nb may be added alone without Ta, and may react with C and N to form fine niobium carbonitride grains (a grain refining effect). Specifically, at least 0.1% of Nb+Ta or Nb is desirably contained. A content exceeding 5C leads to an enhanced precipitation hardenability but to low toughness. The decrease in toughness accompanied by the temper embrittlement can be reduced by the further addition of Mo. Accordingly, the relation between Nb+Ta or Nb and C is expressed by: Nb+Ta≥5C or Nb≥5C, preferably Nb+Ta≥6C or Nb≥6C, more preferably Nb+Ta≥8C or Nb≥8C.

N≤350 ppm

The control of the N content (e.g., the control of N content and the control of Ni-bal) in the precipitation hardening stainless steel of the present invention reduces the retained austenite content of the sintered compact produced by sintering such as MIM, powder sintering and fused deposition molding, and thus provide the sintered compact with high age-hardenability. In particular the powder of the present invention can impart the age-hardenability to the sintered compact because the fused deposition molding repeats alternately melting and rapid solidification of powder in a very small region using high energy sources such as electron beams and laser beams. Furthermore, the appropriate control of Nb, C and N contents lowers the retained austenite content of the sintered compact produced by sintering such as MIM, powder sintering and fused deposition molding while refining a grain size of the sintered compact, resulting in compatibility between high age-hardenability and toughness. That is, N can reduce the grain size and achieve compatibility between high age-hardenability and toughness. The N content is 350 ppm or less, preferably 275 ppm or less, more preferably 250 ppm or less. The N content has no lower limit, and is typically at least 10 ppm.

Furthermore, adjusting the nitrogen content at 350 ppm or less in the steel powder allows the martensite content in the sintered compact after a sintering and quenching process to be 90% or more, preferably 92% or more, and more preferably 95% or more. The reason that the martensite content is adjusted to be 90% or more is as follows. The precipitation hardening stainless steel powder (milled or water-atomized) has a high nitrogen content which is not decreased by reduction treatment for low oxygenation. Introduction of additional nitrogen during sintering/shaping results in an increase in the retained austenite content. A decrease in the low carbon martensitic structure contributing to the age-hardening impairs the age-hardenability. It is, therefore, necessary to decrease the retained austenite content and increase the martensitic structure. The martensite content of 90% or more leads to the achievement of the desired hardness which is 390HV or more after aging treatment, while the martensite content of less than 90% results in no such effect. Accordingly, the martensite content is 90% or more. The martensite content has no upper limit, and is typically 100% or lower.

According to a first preferred embodiment of the present invention, the precipitation hardening stainless steel powder can have a Ni-bal value of preferably −4 or more, more preferably −3.5 or more, still more preferably −3.0 or more, wherein the Ni-bal value is calculated by the following expression: Ni-bal.=Ni+27C+23N+0.2Mn+0.3Cu−1.2(Cr+Mo)−0.5Si−0.3Nb+10. That is, the control of the nitrogen content and the control of the Ni-bal value with reference to a Schaeffler diagram enables the retained austenite content in the sintered compact produced by sintering, for example, the above-described MIM, powder sintering or fused deposition molding to be kept low, and as a result, the content of the low-carbon martensitic structure having high age-hardenability can be desirably controlled to be 90% or more. In particular, the powder of this embodiment is optimal for imparting the age-hardenability to the sintered compact because the fused deposition molding repeats melting and rapid solidification of powder in a very small region using a high energy sources such as electron beams or laser beams.

The Ni-bal, which is proposed by prominent Schaeffler, is based on the Nickel-balance. The Ni-bal of the present invention was determined by multiple analysis from the previously measured values. Furthermore, terms of Cu and Nb are added to the Schaeffler equation, which has no such terms. Furthermore, the reason that the Ni-bal value is set to be −4 or more is as follows. The sintered compact having a largely-shifted Ni-bal value tends to crack due to the increased retained austenite content and the increased δ ferrite content during the initial stage of solidification or sintering (because the coefficients of the thermal expansion are different between the retained austenite phase having FCC and other phases having BCC). In contrast, no cracks are observed at a Ni-bal value of −4 or more. Accordingly, Ni-bal value is preferably −4 or more to yield a robust sintered compact. The Ni-bal value has no upper limit, and typically +3.5 or less.

The sintered compact fabricated from the precipitation hardening stainless steel powder according to a second preferred embodiment of the present invention has preferably a grain size number of 7 or more, more preferably 7.5 or more, still more preferably 8 or more. The sintered compact can have a grain size number of 7 or more, because a grain size number of 7 or more leads to sufficient toughness, while a grain size number of less than 7 leads to an intergranular fracture, resulting in the deterioration in toughness. The grain size is expressed by the grain size number in accordance with JIS G 0551 in which a larger grain size number indicates a smaller grain size. The sintered compact having smaller grains exhibits improved toughness and flexural properties in spite of the same hardness. Accordingly, the grain size number is set to be 7 or more. The grain size number has no upper limit. That is, in the precipitation hardening stainless steel, the appropriate control of Nb, C and N contents can reduce the retained austenite content in the sintered compact produced by sintering such as the above-described MIM, powder sintering and fused deposition molding while forming fine Nb carbonitride to refine the grain size of the sintered compact, resulting in compatibility between high age-hardenability and toughness. In particular, the powder of the embodiment is optimal for achieving compatibility between the high age-hardenability and toughness of the sintered compact because the fused deposition molding repeats melting and rapid solidification of powder in a very small region using high energy sources such as electron beams and laser beams.

EXAMPLES

The present invention will be described in further detail with reference to the following examples.

Spherical powders with low nitrogen content for steels of the present invention having compositions in Table 1 were prepared from vacuum molten metal by gas atomizing. In particular, such powders with a nitrogen content of 350 ppm or less, preferably 275 ppm or less were classified to 53 μm or less through a net sieve of 53 μm mesh size. Similarly, spherical powders outside of the present invention were prepared as comparative materials and also powder having a composition corresponding to that of commercially available stainless steel SUS 630 (JIS G 4303) was used for No.

30. The powders of the present invention and the comparative powders were sintered by powder sintering, solidification by HIP, or fused deposition molding to prepare sintered compacts.

In the powder sintering, the powder was placed in a metal mold having a cross-section of 15 mm square and a length of 40 mm to be preliminarily molded under a molding pressure of 12 MPa at room temperature. The preliminarily molded compact was heated to and held at 120° C. for 1 hour in a vacuum furnace, and then quenched with pressurized nitrogen gas to prepare a sintered compact which is ensured to have a cross-section of 10 mm square and a length of 35 mm. In the solidification by HIP, the powder was placed into an iron container having a diameter of 40 mm and a length of 45 mm and the inside was vacuum-degassed after the lid was welded. The vacuum-degassed container then underwent hot isostatic pressing (HIP) at 1150° C. under a pressure of 147 MPa to prepare a sintered compact of 100% density having a diameter of 35 mm and a length of 35 mm.

In the fused deposition molding, simple square pillar shaping (10 mm in square, 55 mm in length) was carried out in pure Ar or $N_2$ gas atmosphere with a fused deposition molding machine including a laser light source to prepare a sintered compact having the above dimensions. The sintered compact was held at 480° C. for 2 hours and air-cooled for an aging treatment and its relative density and hardness were measured by the Archimedes method and the Vickers hardness test. The number of cracks on the surface of the sintered compact was visually counted for the sintered evaluation. The retained austenite content in the sintered compact was determined by comparison of X-ray diffraction peak integrals between FCC and BCC. Furthermore, the grain size number as a measure of the grain size was measured in accordance with the method prescribed in Steel-Micrographic determination of the apparent grain size in JIS G 0551. The bending strength properties, which relates to the toughness, was confirmed in terms of flexural strength measured by the three-point bending resistance test.

TABLE 1

| No. | C | Si | Mn | Ni | Cr | Mo | Cu | Ti | Al | N | Nb + Ta (=Nb) | Fe | Ni-bal | Sintering method | Sintered compact martensite structure (%) | Sintered compact hardness (HV) | Grain size number | Flexural strength (MPa) | Number of cracks |
|---|---|---|---|---|---|---|---|---|---|---|---|---|---|---|---|---|---|---|---|
| 1 | 0.05 | 1.0 | 1.5 | 3.2 | 12.2 | 0.1 | 1.0 | — | — | 350 | 0.31 | bal. | 0.45 | PS | 95 | 390 | 7 | 753 | 0 |
| 2 | 0.04 | 0.9 | 0.9 | 3.3 | 12.8 | 0.3 | 1.5 | — | — | 300 | 0.28 | bal. | −0.64 | HIP | 92 | 395 | 7 | 776 | 0 |
| 3 | 0.05 | 0.1 | 0.3 | 4.2 | 13.5 | 0.2 | 2.0 | 1.2 | — | 350 | 0.3 | bal. | 0.41 | FDM $N_2$ | 94 | 419 | 9 | 823 | 0 |
| 4 | 0.01 | 0.3 | 0.8 | 5.7 | 15.8 | 1.1 | 3.3 | — | — | 210 | 0.28 | bal. | −2.99 | PS | 96 | 408 | 7 | 789 | 0 |
| 5 | 0.02 | 0.5 | 0.9 | 5.6 | 15.5 | 1.0 | 3.5 | — | 2.4 | 275 | 0.28 | bal. | −2.22 | HIP | 95 | 416 | 8 | 832 | 0 |
| 6 | 0.01 | 0.3 | 0.8 | 5.7 | 15.8 | 1.1 | 3.3 | — | — | 270 | 0.28 | bal. | −2.85 | FDM Ar | 98 | 445 | 11 | 956 | 0 |
| 7 | 0.05 | 0.2 | 1.5 | 8.1 | 13.4 | 2.0 | 4.2 | 1.5 | 1.2 | 320 | 0.35 | bal. | 2.91 | PS | 95 | 430 | 10 | 787 | 0 |
| 8 | 0.04 | 0.1 | 1.8 | 7.6 | 19.2 | 1.2 | 3.5 | 1.5 | — | 340 | 0.4 | bal. | −3.96 | PS | 96 | 406 | 10 | 805 | 0 |
| 9 | 0.04 | 0.3 | 0.8 | 4.9 | 14.8 | 0.5 | 3.5 | — | — | 240 | 0.31 | bal. | −0.94 | PS | 96 | 425 | 8 | 821 | 0 |
| 10 | 0.04 | 0.3 | 0.8 | 4.9 | 14.8 | 0.5 | 3.5 | — | — | 240 | 0.31 | bal. | −0.94 | FDM Ar | 97 | 443 | 9 | 833 | 0 |
| 11 | 0.04 | 0.3 | 0.8 | 4.9 | 14.8 | 0.5 | 3.5 | — | — | 240 | 0.31 | bal. | −0.94 | HIP | 94 | 427 | 8 | 760 | 0 |
| 12 | 0.05 | 0.5 | 1.1 | 4.2 | 17.2 | 0.1 | 4.0 | — | — | 340 | 0.36 | bal. | −3.48 | PS | 95 | 403 | 8 | 814 | 0 |
| 13 | 0.03 | 0.5 | 1.1 | 4.2 | 16.0 | 0.1 | 4.1 | — | — | 197 | 0.28 | bal. | −2.85 | FDM Ar | 99 | 448 | 10 | 923 | 0 |
| 14 | 0.02 | 0.1 | 1.4 | 4.8 | 15.0 | 0.3 | 3.5 | 1.8 | — | 154 | 0.21 | bal. | −1.59 | PS | 94 | 399 | 9 | 767 | 0 |
| 15 | 0.05 | 0.1 | 1.4 | 8.4 | 19.8 | 0.1 | 4.6 | — | — | 345 | 0.28 | bal. | −1.95 | PS | 91 | 392 | 7 | 849 | 0 |
| 16 | 0.05 | 0.9 | 0.9 | 4.9 | 16.8 | 0.8 | 3.1 | 1.1 | 2.0 | 330 | 0.55 | bal. | −3.71 | PS | 93 | 410 | 8 | 792 | 0 |
| 17 | 0.02 | 0.1 | 0.1 | 8.4 | 12.8 | 2.2 | 0.1 | — | 1.2 | 298 | 0.10 | bal. | 1.59 | PS | 96 | 422 | 9 | 917 | 0 |
| 18 | 0.02 | 0.1 | 0.1 | 8.4 | 12.8 | 2.2 | 0.1 | — | 1.2 | 298 | 0.10 | bal. | 1.59 | HIP | 93 | 408 | 7 | 824 | 0 |
| 19 | 0.04 | 0.3 | 0.8 | 4.8 | 17.3 | 0.5 | 3.5 | — | — | 325 | 0.22 | bal. | −3.82 | HIP | 90 | 399 | 8 | 758 | 0 |
| 20 | 0.03 | 0.2 | 0.9 | 4.8 | 17.5 | 0.1 | 3.8 | — | — | 215 | 0.20 | bal. | −3.95 | FDM $N_2$ | 97 | 422 | 10 | 1026 | 0 |
| 21 | <u>0.20</u> | 0.5 | 1.1 | 4.2 | 17.0 | 0.1 | 4.0 | — | — | <u>560</u> | 0.31 | bal. | 1.34 | PS | <u>81</u> | 336 | 6 | 712 | 0 |
| 22 | 0.01 | <u>2.1</u> | 1.8 | 5.4 | 18.4 | 0.5 | 2.9 | 1.5 | — | 333 | 0.38 | bal. | −6.36 | PS | <u>71</u> | 391 | 2 | 481 | 4 |
| 23 | 0.04 | 0.2 | <u>3.1</u> | 4.1 | 13.0 | 1.0 | 4.0 | — | — | <u>364</u> | <u>0.09</u> | bal. | 0.55 | PS | <u>88</u> | 379 | 3 | 588 | 1 |
| 24 | 0.04 | 0.5 | 0.8 | <u>9.4</u> | 16.2 | 0.3 | 3.8 | — | 1.8 | <u>380</u> | 0.39 | bal. | 2.47 | HIP | <u>78</u> | 329 | 6 | 658 | 0 |
| 25 | 0.04 | 0.9 | 1.2 | 6.1 | <u>21.4</u> | 2.1 | 1.2 | 1.2 | 1.2 | 250 | 0.38 | bal. | −10.53 | PS | <u>46</u> | 249 | 3 | 398 | 4 |
| 26 | 0.03 | 0.5 | 0.9 | 6.7 | 13.4 | <u>3.9</u> | 3.4 | — | — | <u>460</u> | <u>0.09</u> | bal. | −1.39 | HIP | <u>81</u> | 311 | 7 | 718 | 0 |
| 27 | 0.04 | 1.0 | 1.0 | 3.1 | 12.7 | 0.9 | <u>6.0</u> | — | — | 339 | 0.35 | bal. | −0.07 | PS | 91 | 394 | 5 | 541 | 3 |
| 28 | 0.03 | 0.8 | 1.0 | 8.4 | 16.5 | 2.0 | 0.1 | 0.05 | — | <u>560</u> | 0.31 | bal. | −2.07 | FDM $N_2$ | <u>18</u> | 192 | 6 | 852 | 0 |
| 29 | 0.05 | 0.7 | 1.1 | 4.1 | 17.7 | 0.1 | 0.1 | — | <u>6.2</u> | <u>450</u> | 0.38 | bal. | −5.20 | PS | <u>85</u> | 366 | 3 | 362 | 3 |
| 30 | 0.04 | 0.9 | 0.9 | 4.0 | 16.1 | 0.2 | 3.5 | — | — | <u>1390</u> | 0.30 | bal. | −0.68 | FDM $N_2$ | <u>70</u> | 267 | 7 | 756 | 0 |

Note)
Underlined values are outside the range of the present invention.
PS, HIP, and FDM indicate "Powder sintering", "Hot isostatic pressing" and "Fused deposition molding", respectively.

As shown in Table 1, No. 1 to No. 20 are Inventive Examples and No. 21 to No. 30 are Comparative Examples. No. 9 to No. 11 correspond to the sintered compacts each prepared from the same powder by different sintering methods and No. 17 and No. 18 correspond to the sintered compacts also prepared from the same powder by powder sintering and HIP, respectively.

As shown in Table 1, the powder of Comparative Example No. 21, which has high C and N contents, yields a sintered compact having a low martensite content, and hence, having low hardness during aging. In addition, Nb carbonitride was coarsened during aging to increase the grain size. As a result, the sintered compact has a low flexural strength. The powder of Comparative Example No. 22, which has a high Si content, yields a sintered compact having high hardness resulting from a high Si content because the base hardness was improved by Si solid solution regardless of a low martensite content. The sintered compact, however, tends to crack due to a low Ni-bal value and has a low flexural strength due to a large grain size, and thus is of no practical use. The powder in Comparative Example No. 23 has such a high Mn content that the martensite content in the sintered compact is low and the content of Nb+Ta or Nb is also low, resulting in insufficient precipitation hardenability. In addition, C is not fixed by Ta or Nb, so that Cr carbide readily precipitates. Thus, the sintered compact of Comparative Example No. 23 cracks and has a low flexural strength.

The powder of Comparative Example No. 24 which has a high content of Ni and N, yielded a sintered compact having a low martensite content despite the addition of Nb+Ta or Nb and having low precipitation hardenability, resulting in a decrease in hardness during aging. Furthermore, C and N, dissolved in the form of a solid solution in the base and form a reduced amount of Nb carbonitride, leading to coarsened grains, resulting in a low flexural strength. The powder of Comparative Example No. 25, which has a high content of Cr, has a low Ni-bal value, and therefore has a large proportion of ferrite structure, which does not involve martensitic transformation, leading to a sintered compact having a relatively low martensite content, and hence having low hardness. Furthermore, the ferrite structure functions as a cracking origin during sintering and also a breaking origin of the flexural test, resulting in a low flexural strength, and therefore no practical sintered compact can be prepared. The powder of Comparative Example No. 26 had a high content of Mo and N that caused the sintered compact to have a decreased martensite content, resulting in insufficient hardness. The flexural strength also decreased proportionally with the hardness.

The powder of Comparative Example No. 27, which has a high Cu content, yielded a sintered compact which had sufficient hardness but cracked due to embrittlement during sintering. The embrittlement also caused low flexural strength. The powder of Comparative Example No. 28 has low contents of Ti, Nb+Ta or Nb and a high N content, and therefore the sintered compact has more retained austenite structure content than the martensite content, and Nb carbonitride is not formed, leading to significantly low precipitation hardenability, resulting in lowered hardness during aging. The powder of Comparative Example No. 29, which has a high Al content, has a low Ni-bal value, and therefore mainly has a ferrite structure, which does not involve martensitic transformation, leading to a sintered compact having a relatively low martensitic structure, and hence having a low hardness. Furthermore, the ferrite structure functions as a cracking origin during sintering and also a breaking origin in the flexural strength test, resulting in a low flexural strength, and thus preclude preparation of practical sintered compacts.

The powder of Comparative Example No. 30, which has a high N content, yielded a sintered compact having a low martensite content, resulting in having low hardness during aging. In contrast, the powders of Invention Examples No. 1 to No. 20 all satisfy the conditions of the present invention, and therefore can yield high hardness materials having a hardness of 390 HV or more and a flexural strength of 750 MPa or more, which do not crack during sintering, by powder sintering, solidification by HIP, or fused deposition molding, and especially the fused deposition molding in an Ar atmosphere achieved hardness of 425 HV or more.

As described above, there is provided precipitation hardening stainless steel powder which can yield a sintered compact having sufficient age-hardenability, a high strength (hard to crack), and a high flexural strength in such a way that the control of the component composition and the nitrogen content (and optionally Ni-bal value) of the precipitation hardening stainless steel powder limits the range of precipitation hardening stainless steel and allowing the sintered compact to have no retained austenite structure content but have an increased martensite content. Furthermore, there is also provided a sintered compact having sufficient age-hardenability, a high strength (hard to crack), and a high flexural strength.

The invention claimed is:

1. A precipitation hardening stainless steel powder comprising, in percentage by mass:
   C: ≤0.05%;
   Si: ≤1.0%;
   Mn: ≤1.8%;
   Ni: 3.0 to 8.5%;
   Cr: 12.0 to 20.0%;
   Mo: 0.1 to 2.5%;
   Cu: 1.0 to 5.0% and/or Ti+Al: 1.0 to 5.0%;
   Nb+Ta≥5C or Nb≥5C;
   N≤350 ppm; and
   the balance being Fe and incidental impurities, wherein a sintered compact fabricated from the steel powder has a martensite content of 90% or more.

2. The precipitation hardening stainless steel powder according to claim 1, containing Mn of 1.5% or less.

3. The precipitation hardening stainless steel powder according to claim 1, having a Ni-bal value of −4 or more, wherein the Ni-bal is calculated by expression (1):

$$\text{Ni-bal}=\text{Ni}+27\text{C}+23\text{N}+0.2\text{Mn}+0.3\text{Cu}-1.2(\text{Cr}+\text{Mo})-0.5\text{Si}-0.3\text{Nb}+10 \quad (1).$$

4. The precipitation hardening stainless steel powder according to claim 3, containing one or two of Ti and Al of 1.0 to 5.0% in a total content.

5. The precipitation hardening stainless steel powder according to claim 3, containing one or two of Ti and Al of 1.0 to 5.0% in a total content without Cu.

6. The precipitation hardening stainless steel powder according to claim 1, wherein the sintered compact fabricated from the steel powder has a grain size number of 7 or more.

7. The precipitation hardening stainless steel powder according to claim 6, containing one or two of Ti and Al of 1.0 to 5.0% in a total content.

8. The precipitation hardening stainless steel powder according to claim 6, containing one or two of Ti and Al of 1.0 to 5.0% in a total content without Cu.

9. The precipitation hardening stainless steel powder according to claim 2, having a Ni-bal value of −4 or more, wherein the Ni-bal is calculated by expression (1):

$$\text{Ni-bal}=\text{Ni}+27\text{C}+23\text{N}+0.2\text{Mn}+0.3\text{Cu}-1.2(\text{Cr}+\text{Mo})-0.5\text{Si}-0.3\text{Nb}+10 \quad (1).$$

10. The precipitation hardening stainless steel powder according to claim 9, containing one or two of Ti and Al of 1.0 to 5.0% in a total content.

11. The precipitation hardening stainless steel powder according to claim 9, containing one or two of Ti and Al of 1.0 to 5.0% in a total content without Cu.

12. The precipitation hardening stainless steel powder according to claim 2, wherein the sintered compact fabricated from the steel powder has a grain size number of 7 or more.

13. The precipitation hardening stainless steel powder according to claim 12, containing one or two of Ti and Al of 1.0 to 5.0% in a total content.

14. The precipitation hardening stainless steel powder according to claim 12, containing one or two of Ti and Al of 1.0 to 5.0% in a total content without Cu.

15. A sintered compact fabricated from the precipitation hardening stainless steel powder according to claim 1, having a martensite content of 90% or more and a grain size number of 7 or more.

* * * * *

UNITED STATES PATENT AND TRADEMARK OFFICE
CERTIFICATE OF CORRECTION

| | |
|---|---|
| PATENT NO. | : 10,011,894 B2 |
| APPLICATION NO. | : 15/112569 |
| DATED | : July 3, 2018 |
| INVENTOR(S) | : Hiroki Ikeda et al. |

It is certified that error appears in the above-identified patent and that said Letters Patent is hereby corrected as shown below:

Column 1, Line 4, below "THEREOF" insert:
-- CROSS REFERENCE TO RELATED APPLICATIONS
This application is the United States national phase of International Application
No. PCT/JP2015/057575 filed March 13, 2015, and claims priority to Japanese Patent Application
Nos. 2014-052499 and 2014-054329 filed March 14, 2014 and March 18, 2014, respectively, the
disclosures of which are hereby incorporated in their entirety by reference. --

Signed and Sealed this
Twentieth Day of November, 2018

Andrei Iancu
*Director of the United States Patent and Trademark Office*